No. 765,659. PATENTED JULY 26, 1904.
H. N. COVELL.
ROPE DRUM ENGINE.
APPLICATION FILED JAN. 13, 1904.
NO MODEL. 6 SHEETS—SHEET 1.

Witnesses:
Raphael Netter
W.G. Pauling

Inventor
Harry N. Covell
by Giffrid & Bull Attys.

No. 765,659. PATENTED JULY 26, 1904.
H. N. COVELL.
ROPE DRUM ENGINE.
APPLICATION FILED JAN. 13, 1904.

NO MODEL. 6 SHEETS—SHEET 2.

Witnesses:
Raphaël Netter
W. A. Pawling

Inventor
Harry N. Covell
by Gifford & Bull Attys.

No. 765,659. PATENTED JULY 26, 1904.
H. N. COVELL.
ROPE DRUM ENGINE.
APPLICATION FILED JAN. 13, 1904.
NO MODEL. 6 SHEETS—SHEET 3.

Witnesses: Inventor
Raphael Netter Harry N. Covell
W. A. Pauling by Gifford & Bull Attys.

No. 765,659. PATENTED JULY 26, 1904.
H. N. COVELL.
ROPE DRUM ENGINE.
APPLICATION FILED JAN. 13, 1904.
NO MODEL. 6 SHEETS—SHEET 4.
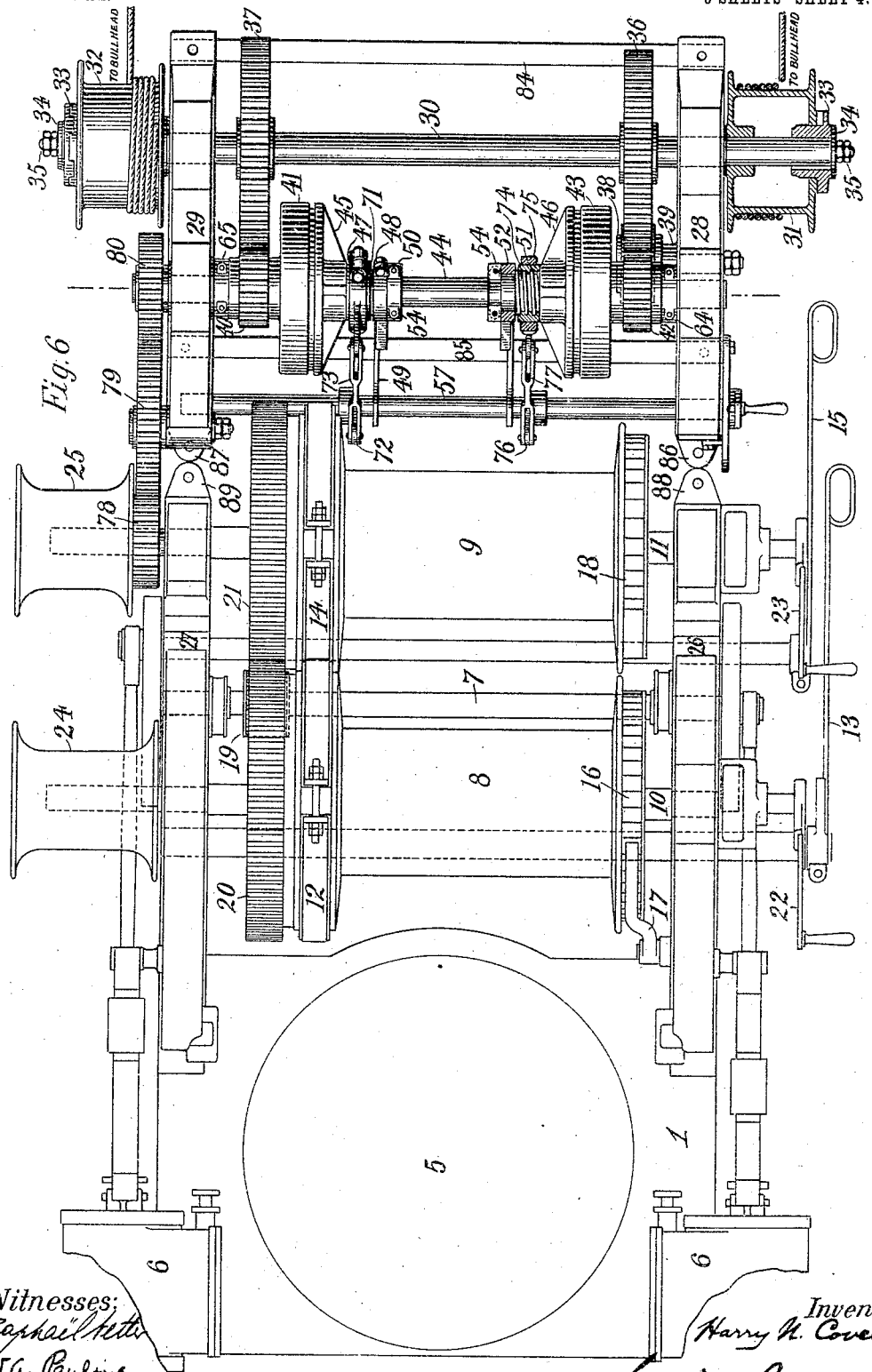
Witnesses:
Raphael Netter
W. A. Pauling
Inventor
Harry N. Covell
by Griffin & Buel Att'ys No. 765,659. PATENTED JULY 26, 1904.
H. N. COVELL.
ROPE DRUM ENGINE.
APPLICATION FILED JAN. 13, 1904.
NO MODEL. 6 SHEETS—SHEET 5.
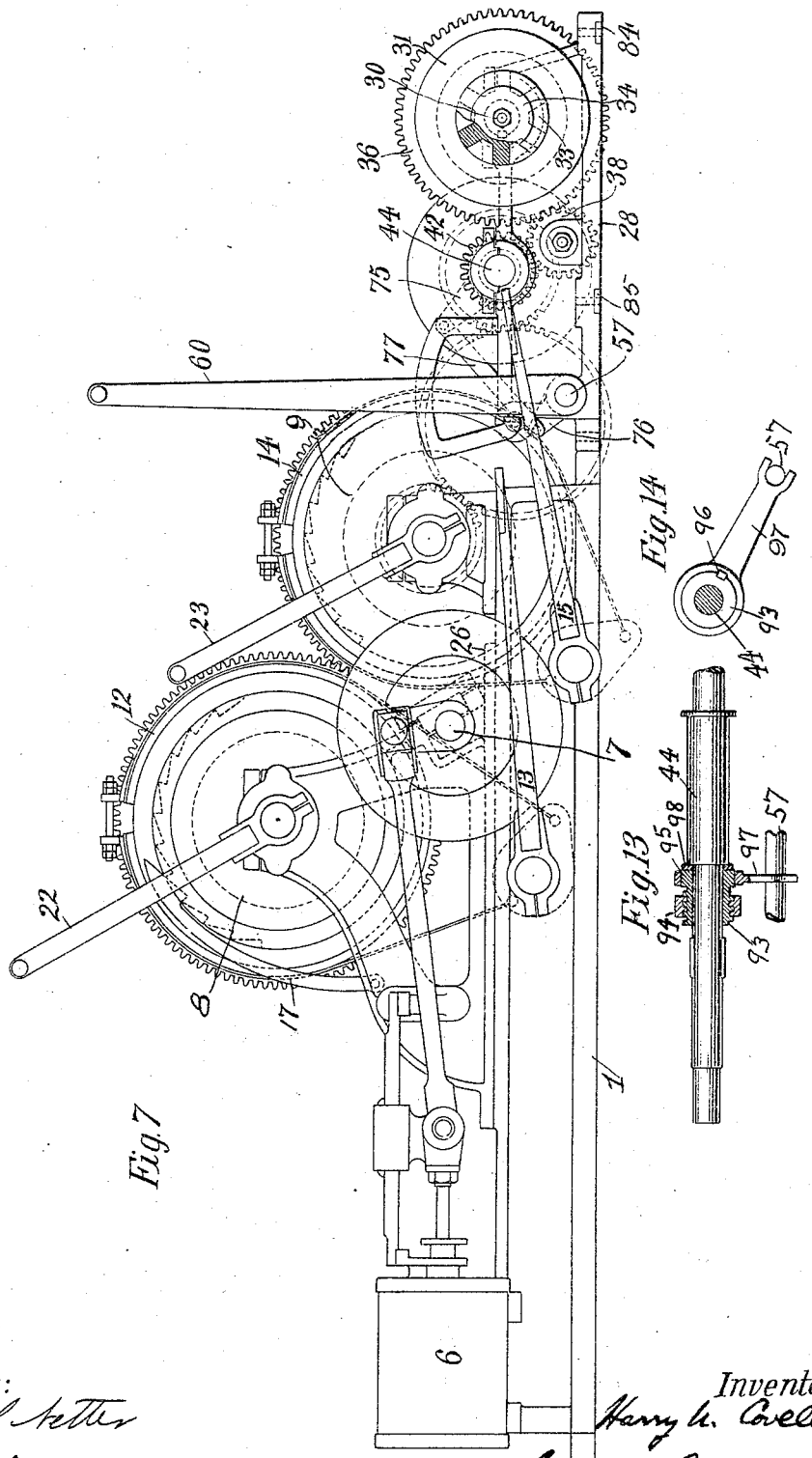
Witnesses:
Raphaël Netter
W. A. Pauling
Inventor
Harry N. Covell
by Gifford & Bull Att'ys

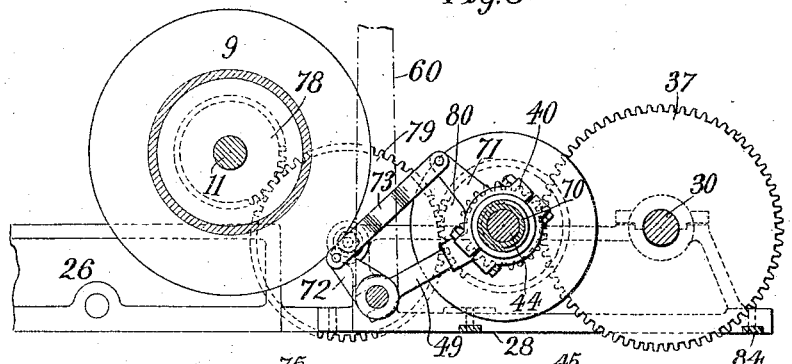
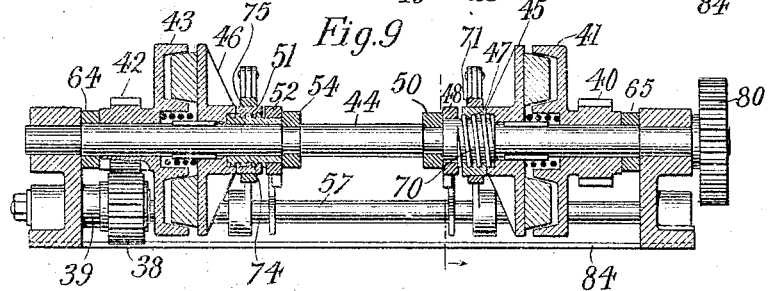
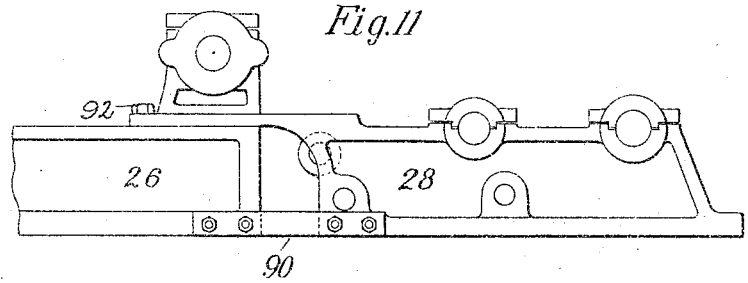
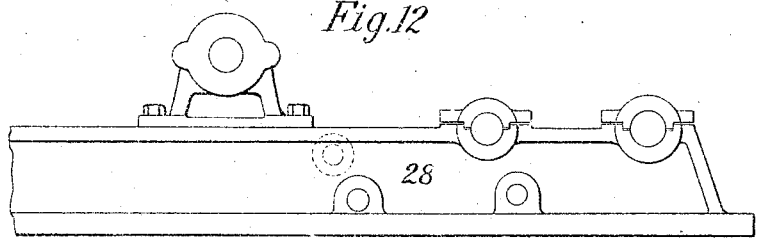
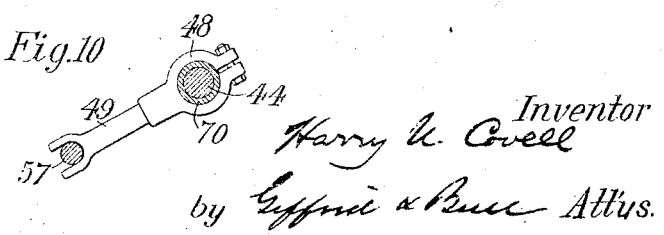

No. 765,659. Patented July 26, 1904.

UNITED STATES PATENT OFFICE.

HARRY N. COVELL, OF NEW YORK, N. Y., ASSIGNOR TO LIDGERWOOD MANUFACTURING COMPANY, A CORPORATION OF NEW YORK.

ROPE-DRUM ENGINE.

SPECIFICATION forming part of Letters Patent No. 765,659, dated July 26, 1904.

Application filed January 13, 1904. Serial No. 188,851. (No model.)

*To all whom it may concern:*

Be it known that I, HARRY N. COVELL, a citizen of the United States, and a resident of the city of New York, borough of Brooklyn, county of Kings, and State of New York, have invented a new and useful Improvement in Rope-Drum Engines, of which the following is a specification.

Figure 1:
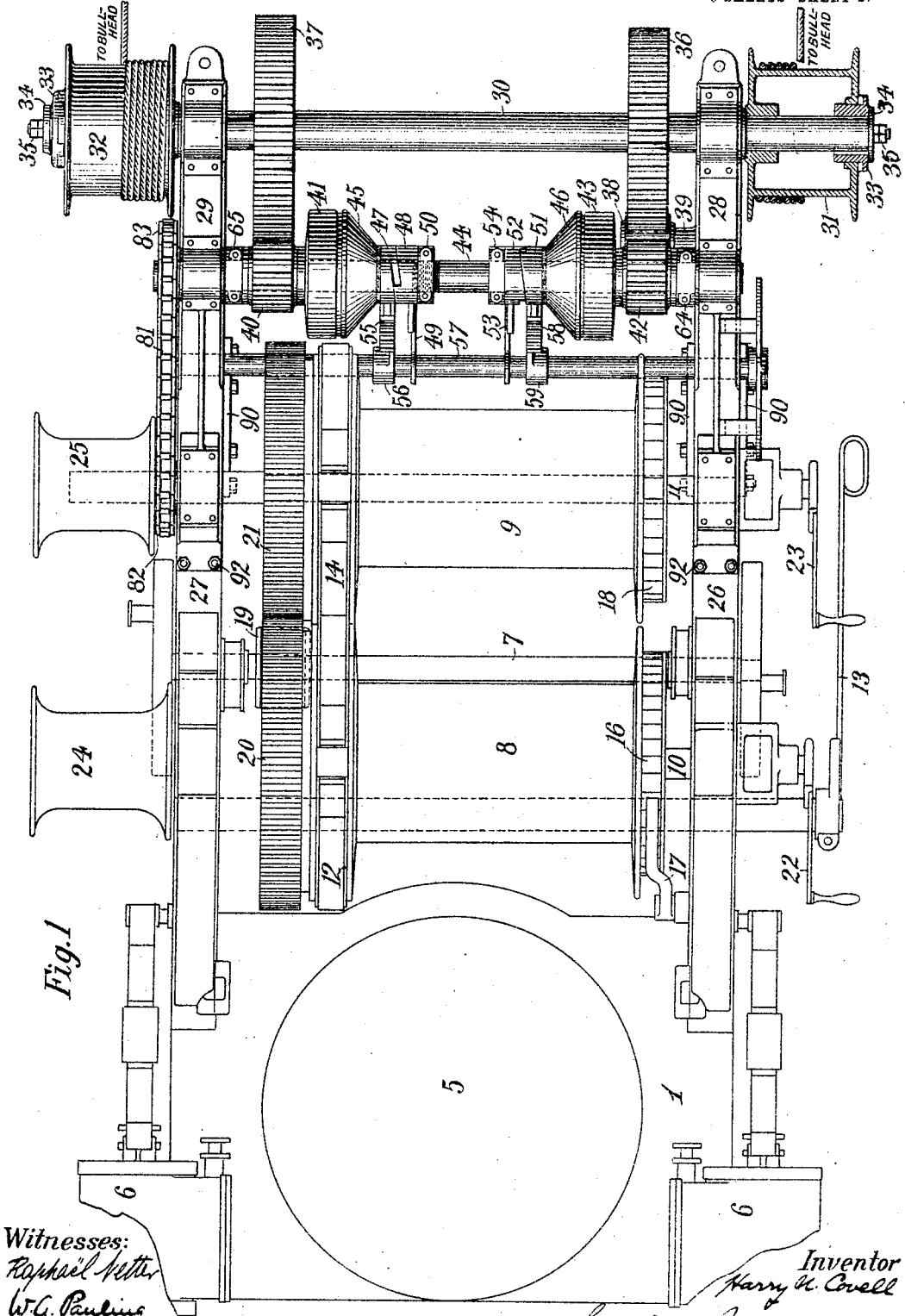
Figure 2:
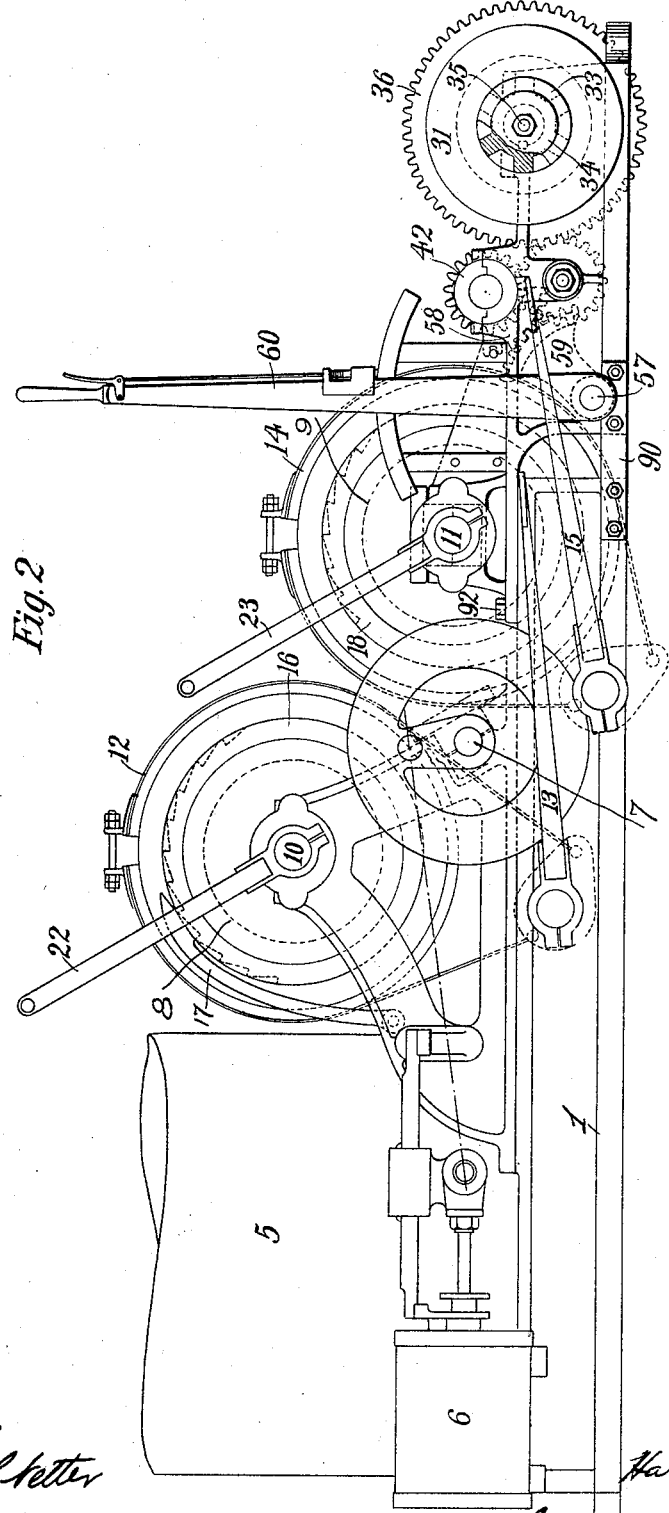
Figure 3:
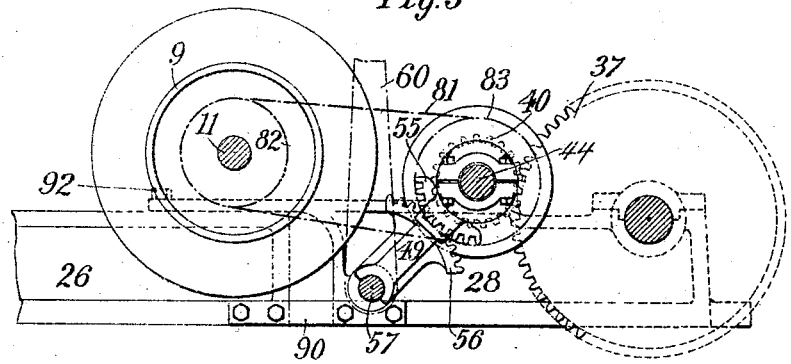
Figure 4:
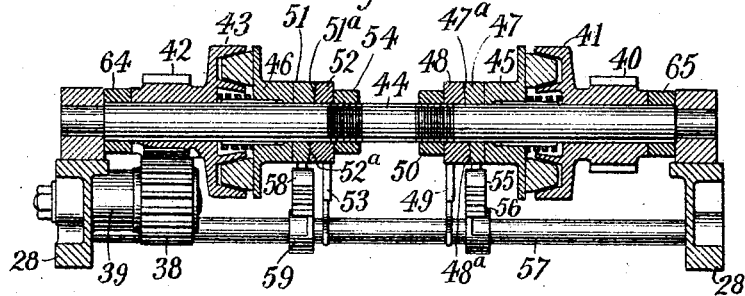
Figure 5:
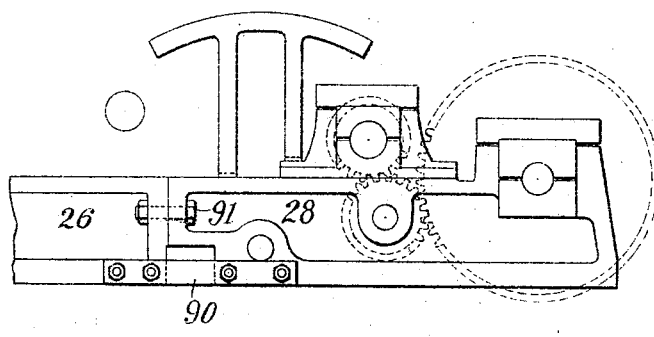

In the accompanying drawings, Figure 1 is a plan view of an engine containing my invention in one form. Fig. 2 is a side view of the same. Figs. 3, 4, 5, and 11 are details thereof. Figs. 6 and 7 are a plan and side view of another form. Figs. 8, 9, and 10 are details thereof. Fig. 12 is a modified form. Figs. 13 and 14 are details of another modification.

I will first describe the hoisting-engine proper, which is of substantially the same construction in all forms shown and which for clearness is in Figs. 1 and 6 drawn in finer lines than the swinging-gear annex.

1 is the hoisting-engine bed-plate.

5 is the boiler.

6 represents the cylinders, and 7 the crank-shaft, of the engine. The connecting-rods and eccentric-rods are omitted from Fig. 1.

8 and 9 are two hoisting-rope drums, one of which is employed for operating the rope to hoist the boom of a derrick and the other to operate the rope that hoists the load. 10 and 11 are the shafts upon which said drums run loosely.

12 is a friction band-brake operated by the foot-lever 13 for controlling the drum 8, and 14 is a friction band-brake operated by the foot-lever 15 for controlling the drum 9.

16 represents ratchet-teeth on the drum 8, engaged by a dog 17. 18 represents similar ratchet-teeth on the drum 9.

19 is a pinion on the engine crank-shaft which drives the spur-wheels 20 and 21, fixed on the drum-shafts 10 and 11, respectively. Any suitable friction-clutch is interposed between the spur-wheels 20 21 and their respective drums 8 and 9. 22 and 23 are the hand-levers by which the friction-clutches of each drum are set.

24 is a winch-head fixed to the end of shaft 10 outside the pillow-block.

25 is a corresponding winch-head fixed to the end of shaft 11. 26 and 27 are the pillow-blocks of the hoisting-engine.

I have shown the swinging-gear annex in two forms, respectively, in Figs. 1 to 5 and 6 to 9. I will first describe those features in which the two forms are alike: 30 is a shaft upon the outer ends of which outside the pillow-blocks are loosely mounted the drums or heads 31 and 32, on which the opposite ends of the swinging or bull-head rope are inversely coiled. Engaging each of these drums is a clutch 33, splined to the shaft 30 and held in engagement with its drum by a plate 34, held by jam-nuts 35. By loosening these jam-nuts the teeth of either clutch may be disengaged from its drum, so as to permit the drum to be turned by hand to tighten the swinging rope. 36 and 37 are spur-wheels fixed to the shaft 30, one of which is driven by the idler-pinion 38, mounted on the stud 39, the other of which is driven by the pinion 40, fixed to a friction-clutch member 41. The idler-pinion 38 is driven by a pinion 42, fixed to a friction-clutch member 43. 64 and 65 are collars on the shaft 44. The pinions 40 and 42 and their connected clutch members 41 43 are revolubly loose on the shaft 44 and are driven therefrom through the friction-clutch members 45 and 46, splined thereto.

Two means are shown for setting the clutch members 45 and 46. I will first describe the means shown in Figs. 1 to 5, wherein the clutch member 45 is set by the rotation of the collar 47 on the collar 48, which is held from rotation by the bracket 49 and held from longitudinal movement by the divided collar 50, said collars 47 and 48 being provided with coöperating cam-faces $47^a$ and $48^a$. The clutch member 46 is set by the rotation of collar 51 on the collar 52, which is held from rotation by the bracket 53 and from longitudinal movement by the divided collar 54, said collars 51 and 52 being provided with coöperating cam-faces $51^a$ and $52^a$. Threads or grooves hold the collars 50 and 54 from longitudinal movement on the shaft, while affording freedom for adjustment. To the cam 47 is fixed a segment-gear 55, moved by a segment-gear 56 on the shaft 57. The cam 51 carries a segment-gear 58, driven by the segment-gear 59 on the shaft 57, which is operated by the hand-lever 60. Thus the forward movement of this hand-lever throws one friction in and the other out. The backward movement reverses this operation. When the lever is in an upright position, neither friction is engaged.

In the construction shown in Figs. 6 to 10, which is the one I prefer, in lieu of the cam-faces $47^a$ $48^a$ and $51^a$ $52^a$ for separating the collar 47 from 48 and 51 from 52 I substitute the following construction: 70 is a brass or composition sleeve loose on the shaft, but fixed to the collar 48 and projecting inside the collar 47, which is screw-threaded thereon. 71 is a clamp on the outside of the collar 47 and oscillated from the shaft 57 by the arm 72 and link 73. Similarly 74 is a sleeve fixed to the collar 52 and projecting inside the collar 51, which is screw-threaded thereon, and 75 is a clamp on the outside of collar 51, which is oscillated from the shaft 57 by the arm 76 and link 77. The screw-threads of the sleeves 70 and 74 are pitched to produce inverse operation. By loosening the clamp 71 or 75 and moving the collar 47 or 51 therein and then tightening the clamp either friction may be adjusted to take up wear.

I prefer to drive the shaft 44 from the shaft 11 by the gears 78, 79, and 80, although the sprocket-chain 81 and wheels 82 83 may be employed, if desired, for the same purpose.

For the purposes of operation the operator stands within reach of the three hand-levers 22, 23, and 60 and the two foot-levers 13 and 15. It is thus within his power to place either of the hoisting-drums 8 9 under either a driving friction or a brake friction and to place the swinging drums 31 32 under a driving friction in one direction or a driving friction in the other direction or in neither direction. Thus without leaving his position the operator has complete command of the derrick both with respect to the hoisting and lowering of the boom, the hoisting and lowering of the load, and the swinging of the boom in either direction.

The frame of the swinging-gear annex is preferably made separable from the frame of the hoisting-engine proper, so that a hoisting-engine may be employed either without or with the annex, and therefore either as an ordinary hoisting-engine or as a complete derrick-engine. I have shown various forms for this construction. In Figs. 6 and 7 the swinging-gear frame consists of the pillow-blocks 28 29 and the connecting-ties 84 85, the pillow-blocks being provided with eyes 86 87, adapted for detachable connection with eyes 88 89 on the pillow-blocks of the hoisting-engine. In this case the hoisting-engine and the swinging gear are each self-contained independently of each other. In the construction shown in Figs. 1 to 5 each pillow-block of the swinging gear is rigidly but detachably secured to a pillow-block of the hoisting-engine, so as to form a substantial extension thereof, this connection being made by the straps 90 and bolts 91 or 92. In Fig. 12 the pillow-block of the swinging frame is shown as non-detachable and integral with the hoisting-engine pillow-block.

The tandem arrangement of the hoisting-drum shafts 10 and 11, the swinging-clutch shaft 44, and the swinging-drum shaft 30 in the order named from the boiler at the rear to the front enables the hoisting-engine and swinging gears being constructed substantially as two units in the manner above set forth.

Although I have shown two swinging drums 31 32 controlling opposite ends of the bull-wheel rope and so mounted that by the rotary adjustment of one or both slack in said rope may be taken up and have also shown them as mounted outside the pillow-blocks, I do not wish to limit myself in these respects, since the drum or drums need not be outside the pillow-blocks, and two drums are not necessary for the movement of said rope.

In Figs. 13 and 14 is shown a third means of setting the clutch members. 93 is a sleeve having screw-threaded thereto a nut 94, which is oscillated in the manner before described from shaft 57. This sleeve is enlarged at one end, 95, and has keyed to it, as at 96, the bracket 97. A washer 98 is inserted between the end of the sleeve and a shoulder on the shaft 44, which at this point is enlarged.

Having thus described my invention, I claim as new and desire to secure by Letters Patent—

1. In combination with a hoisting-engine, a swinger-drum shaft located in front of said engine, a swinger-drum thereon, a clutch-shaft located between said engine and said swinger-drum shaft and clutch mechanism on said clutch-shaft whereby said swinger-drum is controlled.

2. In combination with a hoisting-engine, a swinger-drum shaft located in front of said engine, a swinger-drum on each end of said shaft, and clutches operatively connected with said swinger-drum shaft between said swinger-drums.

3. In combination, as distinct units, a hoisting-engine, a swinging gear in front thereof and an operative connection between the same; said swinging gear comprising a clutch-shaft, clutch mechanism thereon, a drum-shaft, a swinger-drum thereon and an operative connection between said shafts.

4. In combination with a hoisting-engine, a swinger-gear detachably secured to the front thereof and means whereby said swinger-gear is driven from the hoisting-engine.

5. In combination with a hoisting-drum engine, a separable swinging gear consisting of a frame carrying the three shafts 30, 44 and 57 bearing respectively the swinging drums, the reversely-operating clutches and the clutch-operating lever.

6. In combination with a hoisting-engine containing two frictionally-controlled hoisting-drums, a swinger-gear containing the drum-shaft 30, a swinger-drum thereon, the clutch-shaft 44 operatively connected therewith and a connection with the hoisting-engine for operating said shaft 44 and means for controlling the clutch thereon.

7. In combination with a hoisting-engine, a swinger-gear consisting of a hand-operated shaft, a swinger-drum, the shaft thereof, a duplex clutch mechanism interposed between said shafts, a clutch-mechanism shaft, means whereby said clutch-mechanism shaft is driven from the hoisting-engine and a connection whereby said clutch mechanism is controlled from said hand-operated shaft.

8. In combination with a hoisting-engine, a swinger-gear in front thereof, consisting of the shaft 30, two swinger-drums, each adjustably fixed thereto, the clutch members 41 and 43, connections whereby the shaft 30 is driven in opposite directions from said clutch members respectively, a shaft upon which said clutch members rotate, coöperating clutch members rotatably fixed to said shaft, a connection whereby said clutch-member shaft is operated from said hoisting-engine and a hand-controlled mechanism whereby said clutches are set and unset alternately.

9. In combination, the shaft 44, the collars 54 and 64 fixed thereto, the clutch member 43 revoluble on said shaft, the clutch member 46 revolubly fixed to said shaft, screw-threaded sleeve 74 interposed between said clutch member 46 and said collar 54, means whereby the sleeve is held against rotation, the nut 51 engaging said screw-threads, an adjustable clamp 75 on said nut and means whereby said clamp is oscillated.

10. In combination, the following axially-parallel mechanisms arranged in tandem, viz: four shafts, hoisting-drums on two of said shafts, a swinger-drum on another of said shafts and clutch mechanism on the other of said shafts whereby said swinger-drum is controlled.

11. The combination with a hoisting-engine frame and the hoisting-engine mounted thereon, of a swinger-gear frame as a distinct unit in front thereof, a swinging gear mounted on said swinger-gear frame and an operative connection between said engine and gear.

12. In combination, as distinct units, a hoisting-engine, a swinger-gear adjacent thereto and an operative connection between the same, said swinger-gear comprising a clutch-shaft, a clutch mechanism thereon, a drum-shaft, a swinger-drum thereon and an operative connection between said shafts.

13. The combination with a hoisting-drum engine, of a swinger-gear containing a drum-shaft 30, a swinger-drum thereon, a shaft 44, means whereby the same is driven from said hoisting-engine, an idler-pinion 38 operatively connected with said swinger-drum shaft, a gear 37 mounted on said swinger-drum shaft and means whereby said pinion and gear are alternately driven from said shaft 44.

In testimony whereof I have hereunto signed my name in the presence of two subscribing witnesses.

HARRY N. COVELL.

Witnesses:
WALTER A. PAULING,
C. J. RATHJEN.